April 23, 1935. W. S. BRINK 1,998,800

VEHICLE WHEEL

Filed Aug. 6, 1932

INVENTOR
WINFIELD S. BRINK

BY

ATTORNEYS

Patented Apr. 23, 1935

1,998,800

UNITED STATES PATENT OFFICE 1,998,800

VEHICLE WHEEL

Winfield S. Brink, Akron, Ohio, assignor to The Firestone Steel Products Company, Akron, Ohio, a corporation of Ohio Application August 6, 1932, Serial No. 627,709

4 Claims. (Cl. 301—64)

This invention relates to vehicle wheels, and more especially it relates to vehicle wheels of the disc type that carry rims for the mounting of rubber tires thereon.

The chief objects of the invention are to provide an improved wheel having the general characteristics of a disc wheel; to provide conveniently for local strengthening of the wheel where such strength is required; and to provide a wheel of the character mentioned that may be relatively easily and cheaply manufactured as compared to ordinary disc wheels. Other objects will be manifest.

Figure 1:
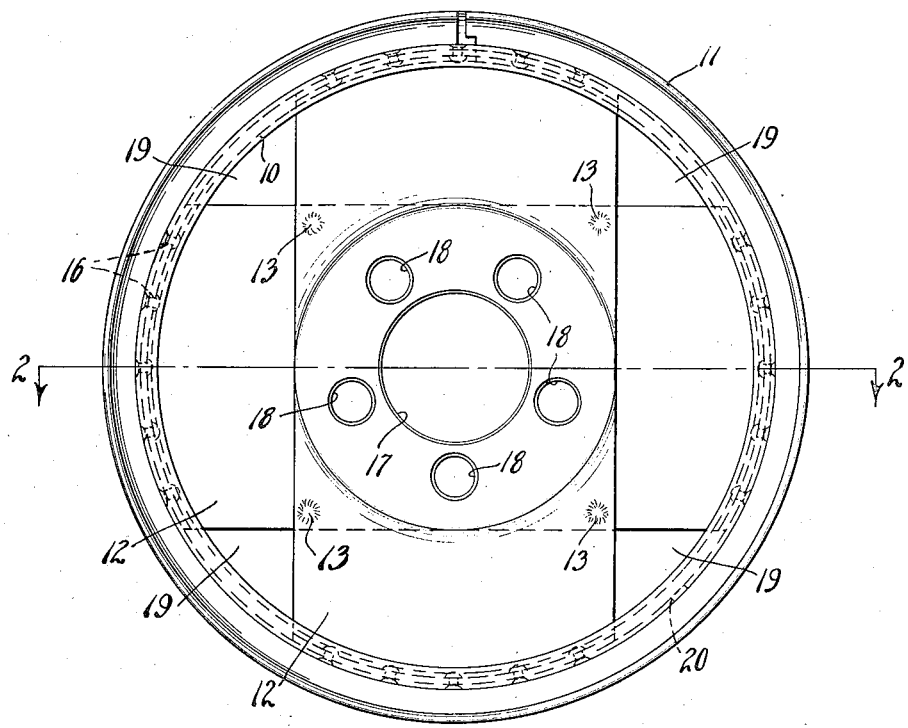
Figure 2:
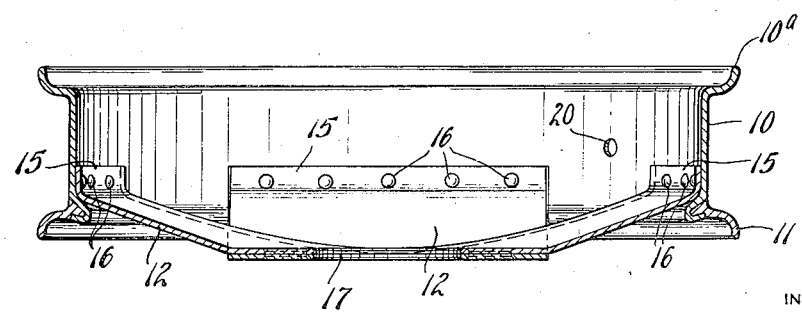

Of the accompanying drawing:

Figure 1 is a front elevation of a vehicle wheel embodying the invention in its preferred form; and Figure 2 is a section on the line 2—2 of Figure 1.

Referring to the drawing, 10 is an annular tire-supporting rim of the type that comprises an integral lateral flange 10ª on one margin and a removable, split ring or flange 11 mounted upon its other lateral margin, said rim being adapted to support a pneumatic tire casing of usual construction. Mounted interiorly of said rim is a disc structure consisting of two relatively wide metal plates 12, 12 that are disposed at right angles to each other, and are secured to each other, in face to face relation, as by spot welding indicated at 13, 13 in the drawing, or by equivalent means.

The plates 12 have central, circular planar portions substantially of the same diameter as the width of the plates, the remainder of each plate being angularly disposed, as is most clearly shown in Figure 2, so as to give a dished effect to the disc structure. The respective end portions of each plate 12 are laterally bent to provide arcuate end flanges 15, 15, and said flanges are secured to the inner peripheral surface of the rim 10, as by means of rivets 16, 16.

The disc structure is formed with an axial aperture 17 to receive an axle or hub structure (not shown), and is formed about said aperture with a circumferential series of equally spaced apertures or bolt holes 18, 18 to receive the bolts by which the wheel is secured to a hub structure. The plates 12 are of such width that the disc structure does not completely fill the rim, and there are four, equally spaced, generally triangular apertures 19, 19 between said disc and the rim. The valve stem aperture 20 of the rim 10 is disposed in alignment with one of said recesses 19 so as to give access to the valve stem of a pneumatic tire that may be mounted upon said rim.

The plates 12 preferably are formed by stamping them to proper shape before welding them together. Thus the usual expensive drawing and spinning operations required for ordinary wheel discs are obviated. The invention provides relatively great strength at the axis of wheel where such strength is desired, and achieves the other advantages set out in the foregoing statement of objects.

Modification may be resorted to without departing from the spirit of the invention of the scope of the appended claims, which are not limited wholly to the specific construction shown and described.

What is claimed is:

1. In a vehicle wheel, the combination of an annular rim, and a pair of metal plates inter- secting each other at right angles at the axis of the rim, and having their end portions secured to the rim, the central portion of each plate being of planar form and the remainder of the plate disposed at an angle thereto, the angularly disposed portions of said plates overlapping radially outwardly of said circular central portion.

2. In a vehicle wheel, the combination of an annular rim, and a pair of metal plates intersecting each other at right angles at the axis of the rim, and having their end portions secured to the rim, the central portion of each plate being of planar form and the remainder of the plate disposed at an angle thereto, the angularly disposed portions of said plates overlapping radially outwardly of said circular central portion, said overlapping portions being welded together.

3. In a vehicle wheel, the combination of an annular rim, and a pair of metal plates intersecting each other at right angles at the axis of the rim, and having their end portions secured to the rim, the central portion of each plate being of planar form to provide a hub portion, portions of said plates overlapping radially outwardly of said hub portion to a point substantially halfway between said hub portion and said rim, said overlapping portions being united to form a reinforced construction outwardly of the hub portion.

4. In a vehicle wheel the combination of an annular rim for supporting a tire, and a pair of crossed plates having their end portions secured to said rim, the intersecting portions of said plates being permanently secured together and formed with circular planar portions, the other portions of said plates being disposed in conical surfaces which partially overlap outwardly beyond said circular planar portion, said overlapping surfaces being welded together, said plates being formed in said planar portion with apertures for the reception of wheel-mounting means.

WINFIELD S. BRINK.